United States Patent
Tanaka et al.

(10) Patent No.: US 7,525,428 B2
(45) Date of Patent: Apr. 28, 2009

(54) ALARM APPARATUS AND ALARM METHOD

(75) Inventors: Masahiro Tanaka, Toyota (JP);
Masachika Kamiya, Toyota (JP); Takeo Endo, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 239 days.

(21) Appl. No.: 11/492,081

(22) Filed: Jul. 25, 2006

(65) Prior Publication Data
US 2007/0046444 A1    Mar. 1, 2007

(30) Foreign Application Priority Data
Aug. 23, 2005    (JP)    ............... 2005-241481

(51) Int. Cl.
G08B 13/08    (2006.01)
H01H 85/00    (2006.01)
(52) U.S. Cl. ................................. 340/545.7; 200/61.08
(58) Field of Classification Search ................. 340/426, 340/429, 550, 545.4–545.8, 598, 430; 359/601–609; 200/61.08
See application file for complete search history.

(56) References Cited
U.S. PATENT DOCUMENTS

| | | | | |
|---|---|---|---|---|
| 4,866,417 A | * | 9/1989 | DeFino et al. | ............... 340/429 |
| 5,627,509 A | * | 5/1997 | Gajewski et al. | ........ 340/426.27 |
| 5,981,907 A | * | 11/1999 | Maue | .......................... 219/203 |
| 6,009,320 A | * | 12/1999 | Dudley | ..................... 455/404.1 |
| 6,535,126 B2 | * | 3/2003 | Lin et al. | ..................... 340/550 |

FOREIGN PATENT DOCUMENTS

| JP | 2003-141649 | 5/2003 |
|---|---|---|
| JP | 2004034934 | 2/2004 |

* cited by examiner

Primary Examiner—Jeff Hofsass
Assistant Examiner—Sigmund Tang
(74) Attorney, Agent, or Firm—Oblon, Spivak, McClelland, Maier & Neustadt, P.C.

(57) ABSTRACT

An alarm apparatus includes an electric conductor disposed at a window pane, a voltage supply device that supplies a voltage to the electric conductor, a voltage detection device that detects the voltage of the electric conductor, a disconnection determination device that makes a determination regarding a disconnected state of the electric conductor based on the detected voltage of the electric conductor, an alarm determination device that determines whether or not to perform alarming based on a result of determination of the disconnection determination device; and an alarm device that performs the alarming based on the determination by the alarm determination device. The alarm determination device has an alert mode of performing if the electric conductor is in the disconnected state, and a pre-alert mode of refraining from performing the alarming if the electric conductor is in the disconnected state.

21 Claims, 2 Drawing Sheets

ALARM APPARATUS AND ALARM METHOD

INCORPORATION BY REFERENCE

The disclosure of Japanese Patent Application No. 2005-241481 filed on Aug. 23, 2005 including the specification, drawings and abstract is incorporated herein by reference in its entirety.

BACKGROUND OF THE INVENTION

1. Field of the Invention

The invention relates to an alarm apparatus and an alarm method for detecting a fracture of a window pane.

2. Description of the Related Art

A vehicle antitheft apparatus that detects a breaking sound of a window pane via a pane breakage sensor and, on the basis of the detection output, informs that a window pane has been broken is known (see, e.g., Japanese Patent Application Laid-Open Publication No. JP-A-2004-34934). However, since the pane breakage sensor in the foregoing vehicle antitheft apparatus is formed by a microphone, the impact sound detected is exclusively sound waves of the audio frequency band; therefore, there is a risk that besides detecting a breaking sound of a window pane, the sensor may falsely detect a noise from outside the vehicle as a breaking sound of a window pane.

As a solution to the aforementioned problem, a pane fracture detector apparatus is known which includes a plurality of resistors arranged on window panes of a vehicle, and which determines whether or not a window pane has fractured on the basis of a change in the partial voltage value of the electric power source applied to the resistors (see, e.g., Japanese Patent Application Laid-Open Publication No. JP-A-2003-141649).

However, there are cases in which, during a non-alarm state prior to an alarm state where the determination as to whether or not a window pane has fractured begins, an abnormality occurs in the resistors or the like resulting in a disconnection of the resistor of a window pane. In such a case, there is a risk of outputting a false alarm without a fracture of any window pane immediately after the pane fracture detector apparatus has changed from the non-alarm state and to an alarm state.

SUMMARY OF THE INVENTION

It is an object of the invention to prevent a false alarm.

A first aspect of the invention relates to an alarm apparatus. This alarm apparatus includes an electric conductor disposed at a window pane, a voltage supply device that supplies a voltage to the electric conductor, a voltage detection device that detects the voltage of the electric conductor, a disconnection determination device that makes a determination regarding a disconnected state of the electric conductor based on the voltage of the electric conductor detected by the voltage detection device, an alarm determination device that determines whether or not to perform alarming based on a result of determination regarding the disconnected state of the electric conductor by the disconnection determination device, and an alarm device that performs the alarming based on the determination by the alarm determination device. The alarm determination device has an alert mode of performing the alarming if the disconnection determination device determines that the electric conductor is in the disconnected state, and a pre-alert mode of refraining from performing the alarming if the disconnection determination device determines that the electric conductor is in the disconnected state.

In the above-described alarm apparatus, the alarm determination device has an alert mode of performing the alarming if the disconnection determination device determines that the electric conductor is in the disconnected state, and a pre-alert mode of refraining from performing the alarming if the disconnection determination device determines that the electric conductor is in the disconnected state. Therefore, for example, if during the pre-alert mode, the disconnection determination device determines that the electric conductor is in the disconnected state, it is possible to detect an abnormality in the initial state, such as a bad contact, a break, etc., in the wiring, the terminals, the connectors, etc. Therefore, it becomes possible to more reliably make a determination regarding a break state of the electric conductor caused by a fracture of a window pane during the alert mode following the pre-alert mode. That is, false alarming can be reliably prevented.

A second aspect of the invention relates to an alarm method. This alarm method includes detecting a voltage of an electric conductor disposed at a window pane, making a determination regarding a disconnected state of the electric conductor based on the voltage detected, and determining whether or not to perform alarming based on a result of determination regarding the disconnected state of the electric conductor. A pre-alert mode and an alert mode are provided for determination as to whether or not to perform the alarming. During the pre-alert mode, the alarming is not performed even if it is determined that the electric conductor is in the disconnected state. During the alert mode, the alarming is performed if it is determined that the electric conductor is in the disconnected state.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Embodiments of the invention will be described hereinafter with reference to the accompanying drawings. It is to be noted that a fundamental concept of vehicle alarm apparatuses as well as a major hardware construction, an operation principle, a fundamental control technique, etc., thereof are known to those of ordinary skill in the art, and will not be described in detail below.

Figure 1:
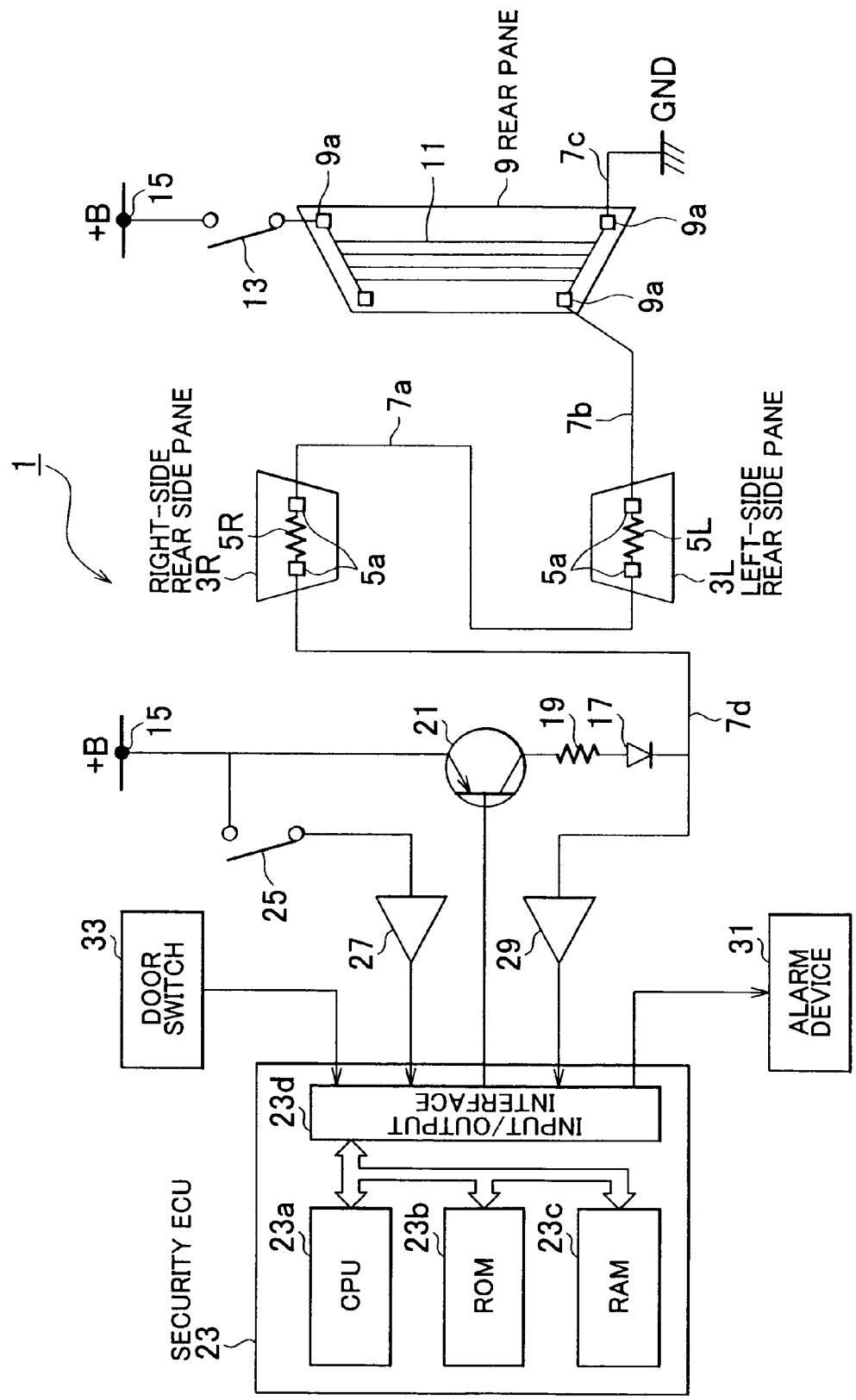
FIG. 1 is a schematic block diagram showing a system construction of a vehicle alarm apparatus in accordance with an embodiment of the invention.

FIG. 1 is a schematic block diagram showing a system construction of a vehicle alarm apparatus in accordance with an embodiment of the invention. In a vehicle alarm apparatus 1 in accordance with this embodiment, right and left rear side panes 3R, 3L of a vehicle are provided with electric conductors 5R, 5L, such as resistors and the like, which are formed by predetermined printed patterns. An end of the resistor 5R of the right-side rear side pane 3R and an end of the resistor 5L of the left-side rear side pane 3L are connected in series via a terminal 5a and a wire 7a.

The other end of the resistor 5L of the left-side rear side pane 3L is connected in series, via a wire 7b and a terminal 9a, to an end of an electric conductor 11 disposed on a rear pane 9, such as a resistor or the like, which is formed by a predetermined printed pattern. The other end of the resistor 11 of the rear pane 9 is grounded (GND) via a terminal 9a and a wire 7c.

As for the predetermined printed patterns of the resistors 5R, 5L, 11 of the rear side panes 3R, 3L and the rear pane 9, one continuous resistor may be arranged in a serpentine-folded form entirely over a pane, or a resistor having a predetermined area may be arranged over an entire pane or a portion thereof. Furthermore, it is also possible to arrange one resistor at a predetermined position on a pane, or arrange a plurality of resistors in parallel as well. That is, any resistor arrangement is applicable as long as fracture of the rear side panes 3R, 3L and the rear pane 9 can be detected on the basis of a break of the resistors 5R, 5L, 11 arranged on the rear side panes 3R, 3L and the rear pane 9.

Furthermore, the resistors 5R, 5L, 11 may be arranged on the surfaces of the rear side panes 3R, 3L and the rear pane 9, or may be arranged within the rear side panes 3R, 3L and the rear pane 9.

As for the resistors 5R, 5L, 11 provided for the rear side panes 3R, 3L and the rear pane 9, it is possible to use a material, such as a transparent electrical membrane, which has transparency and electrical conductivity, in order to secure good visibility for a driver and the like for safety. A transparent electrical membrane to be used may be a material that has low light absorption loss and high transmittance for effective take-up of in-coming light by a light absorbing layer.

The resistor 11 of the rear pane 9 is connected to an electric power source (+B) 15 via an on/off changeover type defogger switch 13 that is disposed near the driver's seat of the vehicle. If the defogger switch 13 is turned on, voltage is supplied from the electric power source 15 to the resistor 11 formed by a predetermined printed pattern arranged on the rear pane 9. Due to the supply of voltage from the electric power source 15 to the resistor 11, the resistor 11 generates heat, whereby condensed moisture or frost on the rear pane 9 is removed. Therefore, during running of the vehicle or the like, good visibility through the rear pane 9 is obtained, and the convenience of the vehicle and the safety thereof improve.

The other end of the resistor 5R of the right-side rear side pane 3R is connected, via a diode 17, a resistor 19, and a switching element 21 such as a transistor or the like, to the electric power source 15 (+B) that supplies voltage to the resistors 5R, 5L, 11, 19. The electric power source 15 may be, for example, a 12V lead battery that is rechargeable.

The switching element 21 is connected to a security ECU (Electronic Control Unit) 23. Upon receiving an on-signal from the security ECU 23, the switching element 21 puts the electric power source 15 and the resistor 19 into a conductive state, thereby supplying voltage to the resistors 5R, 5L, 11, 19. On the other hand, upon receiving an off-signal from the security ECU 23, the switching element 21 puts the electric power source 15 and the resistor 19 into a disconnected state. The security ECU 23 sends the on-signal or the off-signal to the switching element 21 in predetermined cycles so that voltage is supplied from the electric power source 15 to the resistors 5R, 5L, 11, 19 in predetermined cycles.

The security ECU 23 is constructed of a microcomputer, having a CPU (Central Processing Unit) 23a that executes various processes in accordance with control and operation programs and that controls various portions of the apparatus, a ROM (Read-Only Memory) 23b storing executing programs of the CPU 23a, a readable and writable RAM (Random Access Memory) 23c for storing results of computations and the like, a timer, a counter, an input/output interface 23d, etc. Furthermore, the timer and the counter are provided in the ROM 23b, and are realized by programs that are executed by the CPU 23a.

The security ECU 23 is connected to the electric power source 15 via an on/off changeover type ignition (IG) switch 25 that is disposed at the driver's seat in the cabin, and a buffer 27. The buffer 27 has a function of regulating the voltage input from the electric power source 15 to the security ECU 23.

When the ignition switch 25 is turned on, the on-signal is input to the security ECU 23. On the other hand, when the ignition switch 25 is turned off, the off-signal is input to the security ECU 23 (a state where the on-signal is not input).

The other end of the resistor 5R of the right-side rear side pane 3R is connected to the security ECU 23 via a buffer 29 that contains a comparator. Upon input of the partial voltage value obtained by dividing the voltage supplied from the electric power source 15 to the resistors 5R, 5L, 11, 19, the comparator of the buffer 29 compares the input partial voltage value with a preset partial voltage value. If the comparator of the buffer 29 judges, in the aforementioned comparison, that the input partial voltage value is greater than the pre-set partial voltage value, the comparator sends a Hi signal to the security ECU 23. On the other hand, if the comparator of the buffer 29 judges that the input partial voltage value is less than the pre-set partial voltage value, the comparator sends a Lo signal to the security ECU 23.

The resistance of the resistor 19 is set less than the sum total of the resistances of the resistors 5R, 5L, 11. For example, if the resistance of the resistor 19 is 2 kΩ and the sum of the resistances of the resistors 5R, 5L, 11 is 10 kΩ and the reference voltage of the buffer 29 is set at 4 V, the partial voltage value of the electric power source 15 input to the buffer 29 is 2V. In this case, the buffer 29 judges that the partial voltage value 2V is less than the pre-set reference voltage 4V, and then sends the Lo signal to the security ECU 23

A source voltage of 12V is input to the buffer 29 during an abnormal state of the rear side panes 3R, 3L and the rear pane 9 (hereinafter, referred to as "pane abnormality state"), for example, a state where one of the rear side panes 3R, 3L and the rear pane 9 has fractured and therefore the resistor 5R, 5L, 11 of that pane now has a break, or a state where any one of the wires 7a, 7b, 7c, 7d, and the terminals 5a, 9a, connectors, etc. between the rear side panes 3R, 3L and the rear pane 9 has a bad contact or a break, or the like state. The source voltage of 12V input to the buffer 29 is greater than a pre-set reference voltage of 4V. Therefore, the buffer 29 sends the Hi signal, that is, a reverse of the Lo signal, to the security ECU 23.

On the basis of the binary signals, that is, the Hi signal and the Lo signal, sent from the buffer 29, the security ECU 23 detects the existence/absence of a pane abnormality state, such as fracture of any one of the rear side panes 3R, 3L and the rear pane 9, or the like.

For example, if the security ECU 23 continues to receive the Hi signal from the buffer 29 for a predetermined time T2 (e.g., 10 ms) or longer, the security ECU 23 determines that there exists a pane abnormality state, such as a state where the rear side panes 3R, 3L and/or the rear pane 9 has fractured and therefore the corresponding resistor 5R, 5L, 11 has a break, or the like state. If the security ECU 23 receives the Lo signal from the buffer 29, the security ECU 23 determines that there exists a normal state of the rear side panes 3R, 3L and the rear pane 9 (hereinafter, referred to as "pane normality state"), for example, a state where none of the rear side panes 3R, 3L and the rear pane 9 has fractured and none of the wires 7a, 7b, 7c, 7d, the terminals 5a, 9a, the connectors, etc., has a bad contact or a break.

Upon determining that the pane normality state exists, the security ECU 23 sets "1" in a normality determination flag, and stores it in the RAM 23c. The initial value of the normality determination flag is pre-set at "0", and is stored in the RAM 23c beforehand.

An alarm device 31 that performs alarming is connected to the security ECU 23. Upon determining that there exists a pane abnormality state, for example, a state where one of the rear side panes 3R, 3L and the rear pane 9 has fractured and therefore the resistor 5R, 5L, 11 of that pane has a break, the security ECU 23 sends an alarm signal to the alarm device 31. Upon receiving the alarm signal from the security ECU 23, the alarm device 31 performs alarming. Thus, security is improved.

As for the alarm device 31, an alarm sound may be produced by a warning sound device, such as a horn or the like. Furthermore, a lamp of the vehicle, for example, hazard lamps, headlamps, auxiliary lamps, etc., may be lighted up or blinked. Furthermore, display or indicator units in the cabin, such as a display screen, LEDs, etc., may be caused to display an alarm. That is, any alarm device 31 is applicable as long as alarming can be performed.

Door switches 33 disposed in all the doors of the vehicle are connected to the security ECU 23. Each door switch 33 detects a locked state and an unlocked state of a corresponding one of the doors. When a door of the vehicle is locked, the corresponding door switch 33 sends a lock signal to the security ECU 23. When a door is unlocked, the corresponding door switch 33 sends an unlock signal to the security ECU 23.

The security ECU 23 judges that the ignition switch 25 is in an off state on the basis of, for example, the off-signal from the ignition switch 25, and judges that all the doors of the vehicle are locked on the basis of the lock signal from all the door switches 33. Immediately following this judgment, the security ECU 23 recognizes a pre-alert state (pre-alert mode) until the elapse of a predetermined time T1 (e.g., 1 to 3 seconds).

After the elapse of the predetermined time T1 following the judgment that the ignition switch 25 is in the off state and the judgment that all the doors of the vehicle are locked, the security ECU 23 recognizes that it is an alert state (alert mode). In occasions other than the alert state and the pre-alert state, the security ECU 23 recognizes that it is a non-alert state (non-alert mode). During the non-alert state, the security ECU 23 does not attempt detection of a pane abnormality state.

In the conventional alarm apparatus, if there is a bad contact or a break in any of the wires, the terminals, the connectors, etc., between the panes of the vehicle, the security ECU may recognize it as a break of a resistor caused by a fracture of a pane, so as to generate a false alarm, when the security ECU 23 has changed from the non-alert state to the alert state.

In the vehicle alarm apparatus 1 in accordance with this embodiment, however, the security ECU 23 first shifts from the non-alert state to the pre-alert state, and attempts detection of the pane abnormality state (failure in the initial state), such as a bad contact, a break, etc., in any of the wires 7a, 7b, 7c, 7d, the terminals 5a, 9a, the connectors, etc., in an initial state. Then, following the elapse of the predetermined time T1, the security ECU 23 shifts from the pre-alert state to the alert state, and attempts detection of the pane abnormality state, such as a break in any of the resistors 5R, 5L, 11 caused by a fracture of the rear side panes 3R, 3L and/or the rear pane 9, or the like, and performs the alarming if the pane abnormality state is detected. Thus, false alarming can be reliably prevented.

Figure 2:
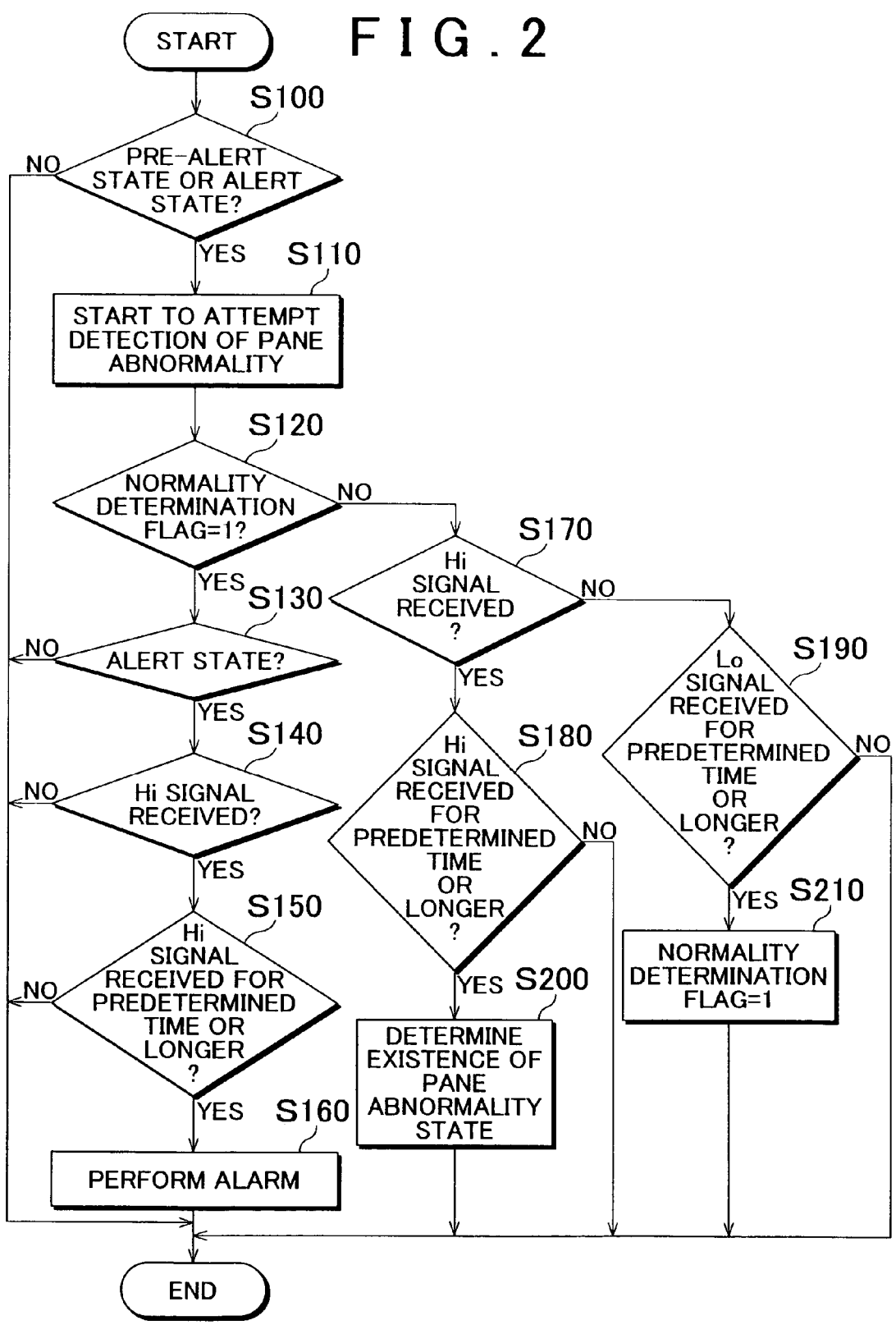
FIG. 2 is a flowchart showing a flow of control of the vehicle alarm apparatus in accordance with an embodiment of the invention.

Next, a control process of the vehicle alarm apparatus 1 in accordance with the embodiment will be described. FIG. 2 is a flowchart showing a flow of control of the vehicle alarm apparatus 1 in accordance with the embodiment of the invention. The process routine shown in FIG. 2 is repeatedly executed at every predetermined very short time, for example, every 64 ms.

The security ECU 23 judges whether or not the vehicle is in either the pre-alert state or the alert state, on the basis of the off-signal from the ignition switch 25 and the lock signal from the door switch 33 (S100).

If the security ECU 23 judges that the vehicle is in either the pre-alert state or the alert state, the security ECU 23 then sends the on-signal to the switching element 21 on a predetermined cycle. Upon receiving the on-signal from the security ECU 23, the switching element 21 assumes the conductive state, whereby voltage is supplied from the electric power source 15 to the rear side panes 3R, 3L and the rear pane 9 on a predetermined cycle. The security ECU 23 thus starts to attempt detection of the pane abnormality state, such as fracture of any of the rear side panes 3R, 3L and the rear pane 9, or the like (S110).

Subsequently, the security ECU 23 judges whether or not the normality determination flag is "1", that is, whether or not there is a history of determining the existence of the pane normality state in the past (S120).

If the security ECU 23 judges that there is a history of determining the existence of the pane normality state in the past (normality determination flag=1), the security ECU 23 then judges whether or not the vehicle is in the alert state (S130).

If the security ECU 23 judges that the vehicle is in the alert state, the security ECU 23 then judges whether or not it has received the Hi signal from the buffer 29 (S140). On the other hand, if the security ECU 23 judges that the vehicle is not in the alert state, the security ECU 23 then ends the routine of the control process.

If the security ECU 23 judges that it has received the Hi signal from the buffer 29, the security ECU 23 then judges whether or not it has been continuously receiving the Hi signal for at least a predetermined time T2 (ms) (S150). On the other hand, if the security ECU 23 judges that it has not received the Hi signal from the buffer 29 (it is receiving the Lo signal), the security ECU 23 then ends the routine of the control process.

If the security ECU 23 judges that it has been continuously receiving the Hi signal from the buffer 29 for at least the predetermined time T2, the security ECU 23 determines that there exists the pane abnormality state, such as a state where the rear side panes 3R, 3L and/or the rear pane 9 has fractured and therefore the corresponding resistor 5R, 5L, 11 has a break, or the like state. In this case, the security ECU 23 sends the alarm signal to the alarm device 31. Upon receiving the alarm signal from the security ECU 23, the alarm device 31 generates an alarm (S160). On the other hand, if the security ECU 23 judges that it has not been receiving the Hi signal from the buffer 29 for at least the predetermined time T2, the security ECU 23 then ends the routine of the control process.

If in the above-described judging process (S120), the security ECU 23 judges that there is not a history of determining the existence of the pane normality state in the past (normality determination flag=0), the security ECU 23 then judges whether or not it has received the Hi signal from the buffer 29

(S170). In this case, the security ECU 23 recognizes that the vehicle is in the pre-alert state.

If the security ECU 23 judges that it has received the Hi signal from the buffer 29, the security ECU 23 then judges whether or not it has been continuously receiving the Hi signal for at least the predetermined time T2 (S180). On the other hand, if the security ECU 23 judges that it has not received the Hi signal from the buffer 29 (it is receiving the Lo signal from the buffer), the security ECU 23 then judges whether or not it has been continuously receiving the Lo signal for at least the predetermined time T2 (S190).

If the security ECU 23 judges that it has been continuously receiving the Hi signal from the buffer 29 for at least the predetermined time T2, the security ECU 23 determines (S200) that a pane abnormality state, such as a state where any of the wires 7a, 7b, 7c, 7d, the terminals 5a, 9a, connectors, etc. between the rear side panes 3R, 3L and the rear pane 9 has a bad contact or a break (failure in the initial state), or the like, exists during the pre-alert state. After that, the security ECU 23 ends the routine of the control process. On the other hand, if the security ECU 23 judges that it has not been continuously receiving the Hi signal from the buffer 29 for at least the predetermined time T2, the security ECU 23 then ends the routine of the control process.

If in the above-described judging process (S190), the security ECU 23 judges that it has been continuously receiving the Lo signal from the buffer 29 for at least the predetermined time T2, the security ECU 23 sets "1" in the normality determination flag (S210), and then ends the routine of the control process. On the other hand, if the security ECU 23 judges that it has not been continuously receiving the Lo signal from the buffer 29 for at least the predetermined time T2, the security ECU 23 then ends the routine of the control process.

In the vehicle alarm apparatus 1 in accordance with this embodiment, the security ECU 23 shifts from the non-alert state to the pre-alert state, and attempts detection of a pane abnormality state, such as a bad contact, a break or the like in the wires 7a, 7b, 7c, 7d, the terminals 5a, 9a, the connectors, etc. during the initial state (failure in the initial state). Then, following the elapse of the predetermined time T1, the security ECU 23 shifts from the pre-alert state to the alert state, and attempts detection of a pane abnormality state, such as a break or the like in the resistors 5R, 5L, 11 caused by a fracture of the rear side panes 3R, 3L and/or the rear pane 9, or the like, and generates an alarm if the pane abnormality state is detected. Thus, false alarming can be reliably prevented.

While an embodiment of the invention has been described above, the invention is not restricted by the embodiment in any manner. On the contrary, the foregoing embodiment can be changed with various modifications and substitutions within the spirit and scope of the invention.

For example, although in the foregoing embodiment, the resistor 19, the resistor 5R of the right-side rear side pane 3R, the resistor 5L of the left-side rear side pane 3L, and the resistor 11 of the rear pane 9 are connected in series in that order, it is possible to connect the resistor 5R of the right-side rear side pane 3R, the resistor 5L of the left-side rear side pane 3L, and the resistor 11 of the rear pane 9 in series in any order.

Although in the foregoing embodiment, detection of a pane abnormality state is performed with respect to the rear side panes 3L, 3R and the rear pane 9, it is possible to perform the detection of a pane abnormality state with respect to any pane of the vehicle, such as the front side panes, the windshield pane, etc. Specifically, if detection of a pane abnormality state of the front side pane is performed, a resistor is disposed at the front side pane, and is connected in series to the rear side pane 3L, 3R or the rear pane 9.

Furthermore, if in the process of S200 in the embodiment, the security ECU 23 determines that there exists a pane abnormality state, such as a state where there is a bad contact or a break in the wires 7a, 7b, 7c, 7d, the terminals 5a, 9a, the connectors, etc., between the rear side panes 3R, 3L and the rear pane 9, or the like state, the alarm device 31 may indicate the abnormality to the driver and the like. Thus, initial failures of the apparatus 1 can be recognized.

In the foregoing embodiment, the alarm device 31, upon receiving the alarm signal from the security ECU 23, may indicate the pane abnormality state to a portable terminal owned or carried by a user, such as a cell phone, a wireless key, etc. In this case, the alarm device 31 has a transceiver, whereby the indication of the information is provided on the user's potable terminal.

In the foregoing embodiment, the state of the resistors 5R, 5L, 11 is converted into a binary signal, that is, the Hi signal or the Lo signal, by the buffer 29, and the security ECU 23 judges whether the resistors 5R, 5L, 11 have a break or the like on the basis of the binary signal. However, it is also possible to detect a change in the resistance of the resistors 5R, 5L, 11 and judge whether the resistors 5R, 5L, 11 has a break or the like on the basis of the change in the resistance.

Although in the embodiment the invention is applied to the vehicle alarm apparatus 1 for use for a vehicle, the invention is not limited thereto. The invention is applicable to any other suitable use; for example, the invention may be applied to an alarm apparatus as a home security apparatus which performs detection of fracture of a window pane and generates an alarm if such fracture is detected.

In the foregoing embodiment, the security ECU 23 corresponds to a break determination device and an alarm determination device described in the appended claims. The break determination device and the alarm determination device are realized by the programs which are stored in the ROM 23b of the security ECU 23, and which are executed by the CPU 23a.

The invention may be used for a vehicle alarm apparatus that performs detection of pane fracture, break, etc., and that generates an alarm for a user. The invention is not concerned with the external appearance of a vehicle in which the apparatus is installed, nor with the weight, size, running performance, etc., thereof.

What is claimed is:

1. An alarm apparatus comprising:
   an electric conductor disposed at a window pane;
   a voltage supply device that supplies a voltage to the electric conductor;
   a voltage detection device that detects the voltage of the electric conductor;
   a disconnection determination device that makes a determination regarding a disconnected state of the electric conductor based on the voltage of the electric conductor detected by the voltage detection device;
   an alarm determination device that determines whether or not to perform alarming based on a result of determination regarding the disconnected state of the electric conductor by the disconnection determination device; and an alarm device that performs the alarming based on the determination by the alarm determination device, wherein the alarm determination device has an alert mode of performing the alarming if the disconnection determination device determines that the electric conductor is in the disconnected state, and a pre-alert mode of refraining from performing the alarming if the disconnection determination device determines that the electric conductor is in the disconnected state.

2. The alarm apparatus according to claim 1, wherein the voltage detection device is a buffer containing a comparator that detects a partial voltage value of a voltage obtained by dividing the voltage supplied from the voltage supply device to the electric conductor, and that compares the partial voltage value with a predetermined voltage value.

3. The alarm apparatus according to claim 1, wherein the alarm device further comprises a transceiver, and sends an alarm signal to a mobile terminal via the transceiver, thereby causing the mobile terminal to perform the alarming.

4. The alarm apparatus according to claim 3, wherein the mobile terminal is a cell phone that performs the alarming based on the alarm signal from the alarm device.

5. The alarm apparatus according to claim 1, wherein the voltage supply device supplies the voltage to the electric conductor on a predetermined cycle.

6. The alarm apparatus according to claim 1, wherein the alarm determination device sets the pre-alert mode for a predetermined time before setting the alert mode.

7. The alarm apparatus according to claim 1, wherein the alarm determination device further has a non-alert mode of refraining from determining whether or not to perform the alarming, and causes shifting among the non-alert mode, the pre-alert mode, and the alert mode.

8. The alarm apparatus according to claim 1, wherein the electric conductor is formed from a material that has a transparency to light.

9. The alarm apparatus according to claim 1, wherein the alarm determination device further has a normality determination flag for storing a value that indicates whether or not the electric conductor has assumed the disconnected state during the pre-alert mode, and wherein the alarm determination device performs the alarming using the alarm device when the disconnection determination device determines that the electric conductor is in the disconnected state during the alert mode and the normality determination flag shows a value indicating that the electric conductor has not assumed the disconnected state.

10. The alarm apparatus according to claim 1, wherein the disconnection determination device determines that the electric conductor is in the disconnected state if the voltage of the electric conductor detected by the voltage detection device is less than or equal to a predetermined voltage.

11. The alarm apparatus according to claim 1, wherein the alarm apparatus is applied to a vehicle, and the electric conductor is disposed at a window pane of the vehicle.

12. The alarm apparatus according to claim 11, wherein the alarm determination device determines setting of the pre-alert mode during a predetermined time after all doors of the vehicle are brought into a locked state while an ignition switch mounted in the vehicle is in an off state, and the alarm determination device determines setting of the alert mode following the elapse of the predetermined time after all the doors are brought into the locked state while the ignition switch is in the off state.

13. The alarm apparatus according to claim 11, wherein the alarm device produces an alarm sound via a horn mounted in the vehicle.

14. The alarm apparatus according to claim 11,
wherein the window pane includes a rear side pane, and a rear pane, and
wherein the electric conductor is disposed at each of the rear side pane and the rear pane, and the electric conductor disposed at the rear side pane and the electric conductor disposed at the rear pane are connected in series.

15. The alarm apparatus according to claim 11, wherein the electric conductor disposed at the rear pane is a resistor of a defogger device which generates heat upon supply of voltage from the voltage supply device so as to remove condensed moisture or frost formed on the rear pane.

16. An alarm method comprising:
detecting a voltage of an electric conductor disposed at a window pane,
making a determination regarding a disconnected state of the electric conductor based on the detected voltage, and
determining whether or not to perform alarming based on a result of determination regarding the disconnected state of the electric conductor,
wherein a pre-alert mode and an alert mode are provided for determination as to whether or not to perform the alarming, and during the pre-alert mode, the alarming is not performed even if it is determined that the electric conductor is in the disconnected state, and during the alert mode, the alarming is performed if it is determined that the electric conductor is in the disconnected state.

17. An alarm apparatus comprising:
an electric conductor disposed at a window pane;
voltage supply means for supplying a voltage to the electric conductor;
voltage detection means for detecting the voltage of the electric conductor;
disconnection determination means for making a determination regarding a disconnected state of the electric conductor based on the voltage of the electric conductor detected by the voltage detection means;
alarm determination means for determining whether or not to perform alarming based on a result of determination regarding the disconnected state of the electric conductor by the disconnection determination means; and
alarm means for performing the alarming based on the result of determination by the alarm determination means,
wherein the alarm determination means has an alert mode of performing the alarming if it is determined by the disconnection determination means that the electric conductor is in the disconnected state, and a pre-alert mode of refraining from performing the alarming if it is determined by the disconnection determination means that the electric conductor is in the disconnected state.

18. The apparatus of claim 1, wherein:
the disconnection determination device determines that the electric conductor is in the disconnected state and sends a binary logic signal representing the disconnected state to the alarm determining device, and
the alarm determination device receives the binary logic signal indicating the disconnected state, but refrains from performing the alarming when in the pre-alert state and performs the alarming only when in the alert state.

19. The apparatus of claim 17, wherein:

the disconnection determination means is also for determining that the electric conductor is in the disconnected state and sending a binary logic signal representing the disconnected state to the alarm determining means, and the alarm determination means is also for receiving the binary logic signal indicating the disconnected state, but refraining from performing the alarming when in the pre-alert state and performing the alarming only when in the alert state.

20. The apparatus of claim 1, wherein when the disconnection determination device determines that the electric conductor is in the disconnected state in the pre-alert mode, the alarm determination device refrains from performing the alarming using the alarm device in the alert mode.

21. The method of claim 16, wherein, when it is determined that the electric conductor is in the disconnected state in the pre-alert mode, the alarming is not performed in the alert mode.

* * * * *